(12) United States Patent
Roques et al.

(10) Patent No.: US 12,528,366 B2
(45) Date of Patent: Jan. 20, 2026

(54) CONTROL OF VEHICLE TRACTION MOTOR TORQUE BEFORE STALL LAUNCH

(71) Applicant: JAGUAR LAND ROVER LIMITED, Coventry (GB)

(72) Inventors: Olivier Roques, Warwickshire (GB); Pierre-Gwenael Meslot, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 291 days.

(21) Appl. No.: 16/971,837

(22) PCT Filed: Feb. 25, 2019

(86) PCT No.: PCT/EP2019/054516
§ 371 (c)(1),
(2) Date: Aug. 21, 2020

(87) PCT Pub. No.: WO2019/162481
PCT Pub. Date: Aug. 29, 2019

(65) Prior Publication Data
US 2021/0078577 A1 Mar. 18, 2021

(30) Foreign Application Priority Data
Feb. 26, 2018 (GB) ..................... 1803045

(51) Int. Cl.
*B60L 15/20* (2006.01)
*B60W 30/18* (2012.01)

(52) U.S. Cl.
CPC ... *B60L 15/2072* (2013.01); *B60W 30/18027* (2013.01); *B60L 2240/12* (2013.01);
(Continued)

(58) Field of Classification Search
CPC .......... B60W 30/18027; B60W 20/00; B60W 2510/087; B60W 2510/1005;
(Continued)

(56) References Cited

U.S. PATENT DOCUMENTS 6,319,168 B1 * 11/2001 Morris ................ B60K 6/54
903/917
6,634,984 B1 * 10/2003 Doering .......... B60W 30/18027
477/181
(Continued)

FOREIGN PATENT DOCUMENTS

EP 1621438 A2 2/2006
FR 2969561 A1 6/2012
(Continued)

OTHER PUBLICATIONS

Hutchinson, "Tesla Motors gives us 'the D'-dual-motor, all-wheel drive Model S variants", 2014, Ars Technica, <https://arstechnica.com/cars/2014/10/tesla-motors-gives-us-the-d-dual-motor-all-wheel-drive-model-s-variants/> (Year: 2014).*
(Continued)

*Primary Examiner* — Helal A Algahaim
*Assistant Examiner* — Karen Lynelle Furgason
(74) *Attorney, Agent, or Firm* — McCoy Russell LLP (57) ABSTRACT

A method for controlling torque generated by at least one traction motor of a vehicle before a vehicle launch includes: determining that torque demand increases while simultaneously at least one brake of the vehicle is in an applied state; in dependence on the determination, limiting torque generation by the traction motor in response to torque demand; and removing the limit in dependence on release of the at least one brake.

10 Claims, 2 Drawing Sheets

(52) U.S. Cl.
CPC ... *B60L 2240/423* (2013.01); *B60L 2240/425* (2013.01); *B60L 2250/26* (2013.01); *B60L 2250/28* (2013.01); *B60W 2510/087* (2013.01); *B60W 2510/1005* (2013.01); *B60W 2520/10* (2013.01); *B60W 2540/10* (2013.01); *B60W 2540/12* (2013.01); *B60W 2710/083* (2013.01); *B60W 2720/403* (2013.01)

(58) Field of Classification Search
CPC ....... B60W 2540/10; B60W 2720/403; B60W 10/119; B60L 15/2072; B60L 2250/26; B60L 2250/28; B60L 2240/463; B60K 1/02; B60K 23/0808; B60K 17/34
See application file for complete search history.

(56) References Cited

U.S. PATENT DOCUMENTS

| | | | |
|---|---|---|---|
| 7,739,005 B1 | 6/2010 | Tang | |
| 9,827,980 B2* | 11/2017 | Yamazaki | B60W 10/184 |
| 2003/0125847 A1* | 7/2003 | Tinskey | B60T 8/1755 |
| | | | 701/1 |
| 2004/0099454 A1* | 5/2004 | Hughes | B60W 20/00 |
| | | | 180/65.25 |
| 2004/0178756 A1* | 9/2004 | Zhenxing | B60W 20/11 |
| | | | 318/432 |
| 2005/0206111 A1* | 9/2005 | Gibson | B60G 11/006 |
| | | | 280/124.104 |
| 2008/0227598 A1* | 9/2008 | Sigmund | B60W 30/19 |
| | | | 477/92 |
| 2010/0116575 A1* | 5/2010 | Nozawa | B60W 30/1884 |
| | | | 180/65.21 |
| 2010/0198449 A1 | 8/2010 | Ueoka et al. | |
| 2012/0046844 A1* | 2/2012 | Okada | B60W 30/18027 |
| | | | 701/70 |
| 2012/0077633 A1* | 3/2012 | Mueller | B60K 23/0808 |
| | | | 475/5 |
| 2013/0060409 A1* | 3/2013 | Matsushita | B60W 10/184 |
| | | | 180/65.23 |
| 2013/0297161 A1* | 11/2013 | Gibson | F16H 61/21 |
| | | | 180/65.265 |
| 2014/0021898 A1 | 1/2014 | Hendrickson et al. | |
| 2014/0212081 A1* | 7/2014 | Takahashi | G01L 5/0019 |
| | | | 384/448 |
| 2015/0005988 A1* | 1/2015 | Cox | B60L 15/2009 |
| | | | 701/3 |
| 2015/0120106 A1* | 4/2015 | Yu | B60W 30/02 |
| | | | 701/22 |
| 2015/0232092 A1* | 8/2015 | Fairgrieve | B60W 30/18172 |
| | | | 701/93 |
| 2016/0082972 A1* | 3/2016 | Fairgrieve | B60W 50/14 |
| | | | 701/84 |
| 2016/0304095 A1* | 10/2016 | Fischer | B60W 30/18118 |
| 2017/0080938 A1* | 3/2017 | Ohashi | B60W 30/16 |
| 2018/0345973 A1* | 12/2018 | Krueger | B60T 13/588 |
| 2019/0248370 A1* | 8/2019 | Cunningham | B60W 30/18018 |

FOREIGN PATENT DOCUMENTS

| | | |
|---|---|---|
| JP | 2003199205 A | 7/2003 |
| JP | 2008054433 A * | 3/2008 |
| WO | 2013160014 A1 | 10/2013 |
| WO | 2014084827 A1 | 6/2014 |

OTHER PUBLICATIONS

International Search Report and Written Opinion, PCT/EP2019/054516, Jul. 9, 2019.
Combined Search and Examination Report, GB1803045.2, Aug. 28, 2018.

* cited by examiner

CONTROL OF VEHICLE TRACTION MOTOR TORQUE BEFORE STALL LAUNCH

CROSS-REFERENCE TO RELATED APPLICATIONS

This application is a 371 of International Application No. PCT/EP2019/054516, filed Feb. 25, 2019, which claims priority to GB Patent Application 1803045.2, filed Feb. 26, 2018, the contents of both of which are incorporated by reference herein in their entirety.

TECHNICAL FIELD

The present disclosure relates to control of traction motor torque before vehicle launch. In particular, but not exclusively it relates to control of traction motor torque before vehicle launch in vehicles or axles where the propulsion is delivered by an electric machine, such as electric-only and hybrid vehicles.

Aspects of the invention relate to a controller, a system, a vehicle, a method and a computer program.

BACKGROUND

To enable a high acceleration of a stationary vehicle, it is known to hold the vehicle on the brake pedal while applying high accelerator pedal demand (APD). The high APD builds up internal combustion engine (ICE) speed and torque, and removes any slack in powertrain and drivetrain components. When a desired speed and torque is reached, the brake pedal is released and high acceleration can be achieved. This process is referred to herein as a vehicle launch.

Vehicle launches are popular in ICE-equipped vehicles because ICEs have a limited torque capability at idle and low rotational speeds. In a hybrid or electric-only vehicle, the electric motor ('traction motor' or 'electric machine' herein) overcomes some of the limitations of ICEs because the traction motor can generate very high level of torque from 0 rpm and maintains it as the speed climbs until it reaches a power limit.

It is an aim of the present invention to address disadvantages associated with the prior art.

SUMMARY OF THE INVENTION

Aspects and embodiments of the invention provide a controller, a system, a vehicle, a method and a computer program as claimed in the appended claims.

Electric traction motors and associated power electronics (such as inverters) have a given torque capability whilst the motor is at 0 rpm, but this amount is noticeably less than the full amount of torque that can be delivered whilst the motor is rotating. It is therefore desirable to apply a vehicle launch strategy to vehicles fitted with electric traction motors, to enable faster acceleration during the launch phase. Launching with a traction motor generates high stall torque before the launch, which can overheat the traction motor and/or power electronics if the amount of energy requested is high (high stall torque and/or is held for a long-duration). Permanent magnet motors can be particularly susceptible to overheating as compared to other traction motors such as induction motors. A vehicle launch with a traction motor can also be referred to as a 'stall launch'.

According to an aspect of the invention there is provided a controller for controlling torque generated by at least one traction motor of a vehicle before a vehicle launch, comprising:

means to determine that torque demand increases while simultaneously at least one brake of the vehicle is in an applied state;

means to, in dependence on the determination, limit torque generation by the traction motor in response to torque demand; and means to remove the limit in dependence on release of the at least one brake.

This provides the advantage of protecting the traction motor and/or associated power electronics from overheating before a stall launch.

In some examples, the controller is configured such that the torque generation is limited before an entry condition for a thermal de-rate function that de-rates the traction motor and/or an entry condition for a thermal de-rate function that de-rates an inverter for the traction motor above a threshold temperature is satisfied. This provides the advantage of preventive, rather than reactive overheating protection.

In some examples, the determination that torque demand increases comprises a determination that increased torque to satisfy at least part of an accelerator pedal demand increase is demanded from the at least one traction motor. This provides the advantage of enabling driver control of stall launch using at least a traction motor.

In some examples, the limit inhibits an amount of torque generation by the electric motor from exceeding a pre-launch threshold. This provides the advantage of a protective thermal limit on stall torque.

In some examples, the pre-launch threshold is configured to be low enough such that thermal de-rating of the traction motor does not activate while the generated torque is at the pre-launch threshold for at least a predetermined length of time. This provides the advantage of preventing overheating for at least the typical time required to prepare a stall launch. In some examples, the pre-launch threshold is configured to be high enough such that the powertrain and/or drivetrain is pre-loaded while the generated torque is at the pre-launch threshold. This provides the advantage of reducing NVH by removing slack and applying twist to the drivetrain. In some examples, the pre-launch threshold is a value equivalent to a percentage of the maximum powertrain torque capability. The optimum value depends on various factors such as the heat rejection capacity of the traction motor and associated power electronics, and may fall as an example within the range of about 10% to about 70% of the maximum powertrain torque capability.

In some examples, the pre-launch threshold depends on at least one of: a gradient that the vehicle is on; a driving mode that is currently active; whether the vehicle is towing; a user setting; a parameter detected by a sensor; an elapsed time period. In some examples, the parameter is related to the temperature of the traction motor and/or power electronics for the traction motor. This provides the advantage that the response lag for meeting torque demand upon removal of the limit can be reduced when the vehicle is launching uphill, off-roading, towing, or similar driving scenarios.

In some examples, it is determined that the at least one brake is in an applied state at least if braking from the driver is above a first threshold. This provides the advantage that the controller better distinguishes between a stall launch and normal driving scenario in which the brakes are not applied, and ensures the vehicle is safely held stationary on the brakes. In some examples, the limit may not be applied in a normal driving scenario because the limit could interfere with intended immediate acceleration.

In some examples, the limit and the first threshold are configured such that the vehicle remains stationary while the limit and first threshold are applied even while torque generated by the at least one traction motor is at the limit. This provides the advantage that braking torque to the wheels exceeds tractive torque to the wheels, so that the vehicle remains held stationary and does not creep forward.

In some examples, the release of the at least one brake is determined at least if braking from the driver falls below a second threshold. This provides the advantage of enabling a more responsive stall launch which can begin before brake pressure falls to zero. Brake pressure can take some time to reduce to zero in the case of hydraulically controlled friction brakes.

In some examples, determining that at least one brake of the vehicle is in an applied state satisfies a requirement for entering a stall launch function of the vehicle, and wherein the means to limit is configured to limit the torque generation if the torque demand increase occurs while simultaneously the stall launch function is in its entered state. This provides the advantage that the controller distinguishes between a stall launch scenario and a normal driving scenario. In some examples, the limit may not be applied in a normal driving scenario because the limit could interfere with intended immediate acceleration.

In some examples, the requirement is one of a plurality of requirements for entering the stall launch function, the requirements comprising one or more of: a transmission of the vehicle is not in neutral or park; the at least one brake is in an applied state first, then torque demand increases and/or rises above a threshold while the at least one brake is still in the applied state; vehicle speed is below a threshold. This provides the advantage of further distinguishing between a stall launch scenario and a normal driving scenario. The requirement(s) for applying brakes first, in a stationary vehicle that is in gear, provide the advantage of improved safety.

In some examples, the controller comprises means to cause a change of torque multiplication between the traction motor and at least one wheel of the vehicle and/or a change of torque split between first and second axles of the vehicle, wherein a direction of the change is dependent on at least one of: a user setting; a parameter detected by a sensor, and to cause implementation of the change before release of the at least one brake. This provides the advantage that the controller can adapt to a driving surface. For example, the torque multiplication may be between 'low' and 'high' transfer case ranges. A low range stall launch may be useful in off-road driving scenarios. The torque split may change between front biased and rear/all-wheel biased driving to find the best traction.

In some examples, the at least one traction motor comprises a first traction motor associated with a front axle of the vehicle and a second traction motor associated with a rear axle of the vehicle. In some examples, the limit is lower for the second traction motor than for the first traction motor. In some examples, the controller comprises means to, when the limit is removed, cause the second traction motor to generate more torque than the first traction motor for meeting torque demand. This provides the advantage of spreading thermal loads between the traction motors. A further advantage is increasing perceptible vehicle squat by front-biasing the torque before launch, and increasing traction during launch by shifting torque rearward for a rear-biased or four-wheel drive launch.

In some examples, the vehicle is an electric-only vehicle or a hybrid electric vehicle, such that all torque demand for tractive torque is demanded of the at least one traction motor. This provides the advantage of a more durable electric powertrain.

According to a further aspect of the invention there is provided a system comprising the controller and at least one traction motor. In some examples, the system comprises the inverter. In some examples, the system comprises a traction battery.

According to a further aspect of the invention there is provided a vehicle comprising the system. According to a further aspect of the invention the vehicle is an electric-only vehicle or a hybrid electric vehicle.

According to a further aspect of the invention there is provided a controller comprising at least one electronic processor; and at least one electronic memory device electrically coupled to the electronic processor and having instructions (a computer program) stored therein, the at least one electronic memory device and the instructions configured to, with the at least one electronic processor, perform:
  determining that torque demand increases while simultaneously at least one brake of the vehicle is in an applied state;
  in dependence on the determining, implementing a limit of torque generation by the traction motor in response to torque demand; and
  removing the limit in dependence on release of the at least one brake.

The controller 'means' as described herein may equate to the at least one electronic processor; and at least one electronic memory device electrically coupled to the electronic processor and having instructions stored therein.

According to a further aspect of the invention there is provided a method of controlling torque generated by at least one traction motor of a vehicle before a vehicle launch, comprising:
  determining that torque demand increases while simultaneously at least one brake of the vehicle is in an applied state;
  in dependence on the determining, implementing a limit of torque generation by the traction motor in response to torque demand; and
  removing the limit in dependence on release of the at least one brake.

According to a further aspect of the invention there is provided a computer program that, when run on at least one electronic processor, causes the electronic processor to cause controlling torque generated by at least one traction motor of a vehicle before a vehicle launch, comprising:
  determining that torque demand increases while simultaneously at least one brake of the vehicle is in an applied state;
  in dependence on the determining, implementing a limit of torque generation by the traction motor in response to torque demand; and
  removing the limit in dependence on release of the at least one brake.

According to a further aspect of the present invention there is provided a (non-transitory) computer readable medium comprising the computer program.

According to a further aspect of the present invention there is provided a controller for controlling torque generated by at least one traction motor of a vehicle before a vehicle launch, comprising: means to limit torque generation by the traction motor in response to torque demand, before vehicle launch, if a first condition is satisfied, wherein the first condition is configured to be satisfied before a thermal de-rate condition for a thermal de-rate function is satisfied, wherein the thermal de-rate function de-rates the traction motor and/or an inverter above a threshold temperature. This relates to a situation in which the entry condition for applying the limit may be other than braking and then increasing the torque demand. The first condition may be satisfied by any one or more of the aforementioned requirements for entering the stall launch function, and/or any other condition associated with torque demand and/or braking demand and/or generated torque and/or use of brakes and/or entering a stall launch mode. Entering a stall launch mode may require, for example, user actuation of a finger-operated human machine interface in some implementations. The vehicle may even need to be in a certain driving mode such as a sport mode which increases torque output and/or firms up suspension, etc. Satisfaction of the first condition is effectively independent of the current temperature of the traction motor and/or inverter. The limit may be removed when the first condition is no longer satisfied and/or when a different condition is satisfied that signals a request to launch, such as, for example, a user command to a finger-operated human-machine interface requesting launch. Other features of this implementation may be similar to those described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1A:
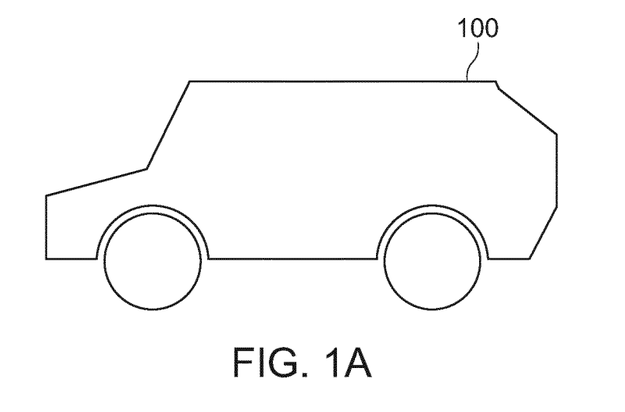
FIG. 1A illustrates an example of a vehicle.

FIG. 1A illustrates an example of a vehicle 100 in which embodiments of the invention can be implemented. In some, but not necessarily all examples, the vehicle 100 is a passenger vehicle, also referred to as a passenger car or as an automobile. Passenger vehicles generally have kerb weights of less than 5000 kg. In other examples, embodiments of the invention can be implemented for other applications, such as industrial vehicles, air or marine vehicles.

Figure 1B:
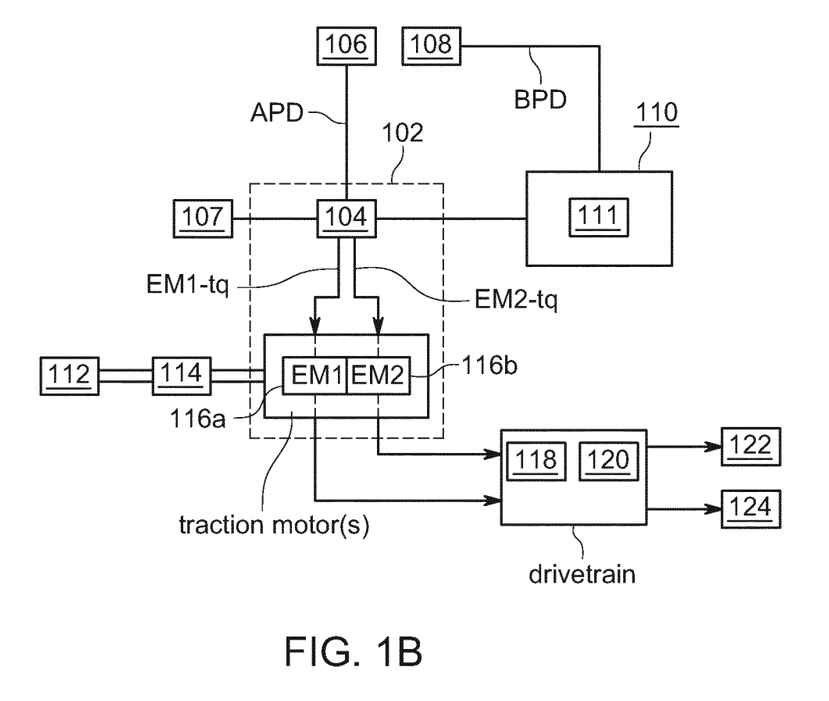
FIG. 1B illustrates an example of a system.

FIG. 1B shows an example of a system and various related subsystems for a vehicle such as the vehicle 100 of FIG. 1A.

The vehicle of FIGS. 1A and 1B is an all-electric vehicle. Such vehicles do not comprise internal combustion engines (ICEs), and are only driven by at least one traction motor 116a, 116b supplied with electrical energy from a high-voltage (hundreds of volts) traction battery 112 via an inverter 114, as shown. In some examples, each traction motor has its own inverter. The traction motor may be a permanent magnet motor, which has been found to be more susceptible to overheating than induction motors, or may be an induction motor or any other type. FIG. 1B shows two traction motors EM1 116a and EM2 116b, although any number can be provided, for example one for each wheel. In other examples, the vehicle 100 may be a series hybrid electric vehicle, with a range-extending ICE. In still further examples, the vehicle 100 may be a parallel hybrid electric vehicle, wherein an ICE can provide at least some tractive torque.

If the vehicle 100 is capable of changing a torque multiplication between the traction motor 116a, 116b and the wheels, the vehicle 100 may comprise a transmission 118 and/or a transfer case 120. The transmission 118 may be of any appropriate type of gearbox. The transfer case 120 would be downstream of the transmission 118, and may be capable of controlling front-rear axle torque split and/or whether the vehicle 100 is in a high 'H' or low 'L' range.

In one example, each of the two traction motors EM1 116a and EM2 116b is coupled to a separate axle 122, 124. EM1 is coupled to a front axle 122 and EM2 is coupled to a rear axle 124. In this example, a transfer case may not be required.

The vehicle 100 is capable of being driven manually, therefore the vehicle 100 comprises manual controls including an accelerator pedal 106, a brake pedal 108, and a steering wheel (not shown). In some examples, the vehicle 100 is semi-autonomous, such that acceleration and braking can be controlled automatically by an advanced driver assistance system (ADAS) (not shown) under driver supervision, when ADAS is active.

Other driver inputs may include one or more human-machine interfaces (HMI) such as switchgear and touchscreens (not shown) for enabling the driver to control infotainment, powertrain settings, driving mode settings, suspension settings, and other user settings for the vehicle 100.

Figure 2A:
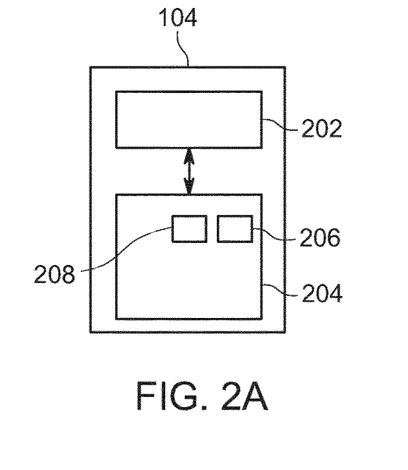
FIG. 2A illustrates an example of a controller.

FIG. 1B also illustrates a controller 104 of at least the powertrain. The controller 104 and at least one traction motor 116a, 116b may together define a system 102. In some examples, the system 102 may include any one or more of the other components shown in FIG. 1B. The controller 104 may consist of a single discrete control unit such as shown in FIG. 2A and described below, or its functionality may be distributed over a plurality of such control units.

Various subsystems of FIG. 1 are operably coupled to the controller 104 via any appropriate means, for example via a communications bus (e.g. CAN bus).

The controller 104 is configured to receive an accelerator pedal demand (APD) signal from the accelerator pedal 106, e.g. from 0% to 100%, and convert the signal into a torque demand for the powertrain (e.g. PT_tq).

If the vehicle 100 is a parallel hybrid vehicle, PT_tq may be split into an ICE component (Eng_tq) and a traction motor component (EM_tq). The split may depend on a strategy implemented by an energy management system (not shown) and other systems. In an electric-only vehicle, PT_tq is EM_tq.

In the case of traction motors coupled to different wheels or axles, EM_tq may be further split into EM1_$tq$, EM2_$tq$ such as shown in FIG. 1B. In an example, the split can control whether drive of the vehicle 100 is front-biased or rear-biased, and/or left-biased or right-biased. The torque generated by the traction motor(s) is generally proportional to APD when the vehicle is under manual control.

The conversions and splits as described above may also be influenced by one or more functions such as ADAS torque demand, traction control, stability control, four-wheel steering, electronic differential, energy management, etc.

The maximum torque of a traction motor is defined as the torque it produces when maximum torque demand is applied and held in normal operation. This corresponds at least to 100% APD. In an example, this corresponds to a particular steady-state root-mean-square stator current applied to the traction motor.

The vehicle 100 comprises a brake system 110 comprising at least one brake 111. The at least one brake 111 may comprise a friction brake for generating negative (braking) wheel torque. The friction brake 111 may be implemented as a disc brake or a drum brake. The at least one brake 111 may comprise a brake for each wheel of the vehicle 100.

Application of the brake 111 may be proportional to a brake pedal demand (BPD) signal from the brake pedal 108. In some examples, the BPD signal may be generated by a parking brake function which is actuated automatically by a function such as a hill-hold function to prevent roll-back, or manually by a button or lever or the like. Such a function is referred to as an electronic parking brake (EPB) function. In some examples, EPB's have dedicated brakes.

In some examples, the brake system 110 may operate on hydraulic pressure. Hydraulic brake pressure can be modulated by a brake pressure modulator pump, for example. In an example, the BPD signal is converted to a required hydraulic brake pressure which corresponds to a required braking torque. The pump causes that pressure to be applied. Alternatively, actuation of the at least one brake 111 may be mechanical, electrical or pneumatic.

In FIG. 1B, the BPD signal is first received by the brake system 110 and the brake system 110 is able to communicate information about braking to the controller 104. Alternatively, the controller 104 may first receive BPD and control the functions of the brake system 110.

FIG. 1B also shows sensing means 107 for sensing one or more other variables to enable the controller 104 to perform one or more functions described herein. Any of the sensors described herein may form part of the sensing means 107.

If the vehicle 100 is drive-by-wire, one or more of the above-described signals and demands may be expressed as electronic signals.

An implementation of the controller 104 and various functions of the controller 104 will now be described, with reference to FIGS. 2A and 2B.

A control unit is shown in FIG. 2A which may implement, at least in part, the functionality of the controller 104. The controller 104 comprises means to cause any one or more of the methods described herein to be performed.

The controller 104 includes at least one electronic processor 202; and at least one electronic memory device 204 electrically coupled to the electronic processor 202 and having instructions 206 (e.g. a computer program) stored therein, the at least one electronic memory device 204 and the instructions 206 configured to, with the at least one electronic processor 202, cause any one or more of the methods described herein to be performed.

In FIG. 2A, but not necessarily all examples, the electronic memory device comprises instructions 208 for a thermal de-rate function. In an example, the thermal de-rate function causes the controller 104 to determine whether the traction motor 116a, 116b and/or inverter 114 is overheating (entry condition), and if so, de-rate the traction motor 116a, 116b such that it is capable of generating less torque than required by torque demand EM_tq. This prevents damage to the powertrain. The determination may rely on temperature information from a temperature sensor(s) that measures the temperature of the traction motor 116a, 116b and/or inverter 114. Alternatively, the determination may rely on a thermal model that relates torque/stall torque generated by the traction motor 116a, 116b to a temperature of the traction motor 116a, 116b and/or inverter 114.

Figure 2B:
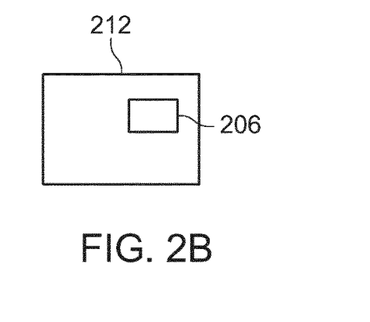
FIG. 2B illustrates an example of a computer-readable storage medium.

FIG. 2B illustrates an example of a non-transitory computer-readable storage medium 212 comprising the computer program 206.

A stall launch function will now be described with reference to a stall launch time history shown in FIG. 3. The stall launch function may be implemented in instructions readable by a controller, such as the instructions 206. The time history is a graph showing multiple variables over time during implementation of the stall launch function: hydraulic brake pressure; APD; generated torque by the traction motor 116a, 116b; and vehicle speed.

The stall launch function comprises one or more entry requirements to determine that the vehicle 100 requires a stall launch.

An entry requirement is that the brake(s) 111 of the vehicle 100 is in an applied state.

There are various ways of determining that a brake 111 is in an applied state. For example, the presence of BPD could provide an indication that a brake 111 is applied. A sensor in the brake system 110 could detect a parameter indicative of the use of brakes such as hydraulic brake pressure. In some examples, the determination may be specific to driver-requested braking, so a positive BPD may be required. A first threshold may be implemented such that the determination is made only when the braking (e.g. BPD or hydraulic brake pressure) increases past a first threshold.

Figure 3:
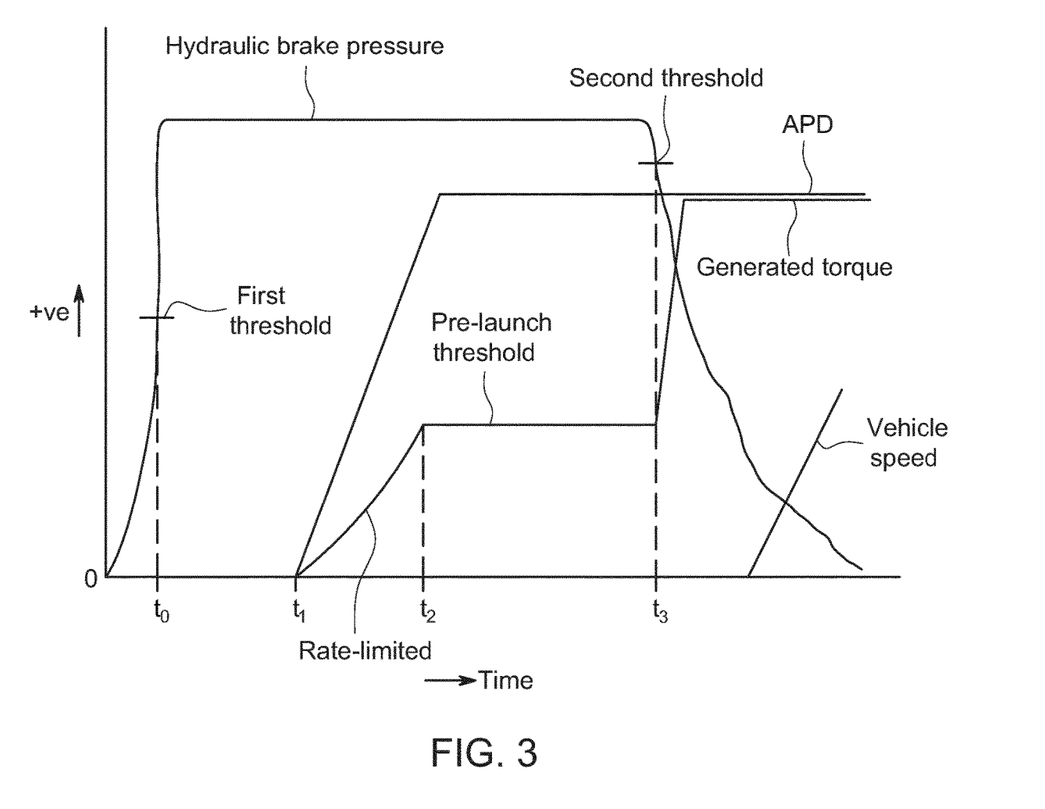
FIG. 3 illustrates an example of a stall launch time history.

FIG. 3 provides an example. At time t0 hydraulic brake pressure increases past a first threshold, satisfying the requirement of a brake(s) 111 being in an applied state.

An entry requirement is that torque demand increases while simultaneously the at least one brake 111 of the vehicle 100 is in an applied state. In some examples, the entry requirement is that the at least one brake 111 is in an applied state first, then the torque demand increase is determined while the at least one brake 111 is still in the applied state. This forces the driver to be on the brake pedal 108 initially to avoid unexpected unintended acceleration. Referring to FIG. 3, it may be necessary for t1 (stall launch function entered) to occur at least a predetermined time after t0, without the hydraulic brake pressure falling below the first threshold at any point between t0 and t1.

There are various ways of detecting that torque demand increases. A determination that torque demand increases could comprise determining that a signal dependent on torque demand is above a threshold. For example, the determination may be that APD>threshold, PT_tq> threshold, or EM_tq>threshold, EM1_$tq$>threshold, EM2_$tq$> threshold, etc. The threshold could be equivalent to the baseline traction motor torque at 0% APD, for example 0 Nm, or higher if the traction motor implements an 'idle' speed or creep torque function.

FIG. 3 provides an example. At time t1 APD becomes a positive non-zero value while the hydraulic brake pressure is still above the first threshold, satisfying the requirement of simultaneous torque demand and braking. If this is the only entry requirement, the stall launch function is entered at time t1.

If the stall launch function is for racing launches (maximum acceleration), the threshold torque demand could be higher such as a value above 50% or above 70%, or 100% of the relevant torque demand. In some examples, the determination may be specific to driver-requested torque demands, and not to autonomous-driving torque demands, so a positive APD may always be required.

Another optional entry requirement is that a transmission 118 of the vehicle 100 is not in neutral or park, and optionally not in reverse if reverse launches are prohibited.

Another optional entry requirement is that the stall launch function is not already currently active.

Another optional entry requirement is that vehicle speed is below a threshold. For example, the vehicle speed may need to be zero, i.e. vehicle stationary.

In some examples, the stall launch function is available in any driving mode (e.g. normal, rain/ice/snow, dynamic, rock crawl, grass/gravel/snow, mud/ruts/sand). Each mode determines one or more different powertrain (engine map) and/or drivetrain (shift map, transfer case range, 2/4 wheel drive) and/or suspension (ride height, damping) and/or steering (weight, ratio) settings of the vehicle 100. Therefore, stall launch can be simple to use, requiring fewer actions such as setting a driving mode, and may be usable in off-road modes such as rock crawl, in which high launch torque may be required. In other examples, selection of a particular driving mode (e.g. via HMI or a terrain sensor [imaging sensor]) is another entry requirement.

Notably, all the entry condition(s) described above are independent of temperature of the traction motor 116a, 116b/inverter 114.

If the stall launch function is entered, the controller 104 limits torque generation by the traction motor 116a, 116b (e.g. EM1) in response to torque demanded of the traction motor 116a, 116b (e.g. EM1_tq). One or more requirements for implementing the limit is or matches one or more of the requirements for entering the stall launch function, or at least relates to a same parameter such as braking and torque demand. This ensures that the limit is applied in stall launch scenarios but not in other scenarios. In a particular example, implementation of the limit requires a (or the) determination that torque demand increases while simultaneously at least one brake 111 of the vehicle is (or is already) in an applied state. In some examples, one or more requirements for implementing the limit may be that the stall launch function is active.

In some examples, one or more requirements for implementing the limit may be a temporal requirement. The temporal requirement may be satisfied if a temporal parameter associated with torque demand is below a threshold. For example, the temporal parameter may be a rate of change of torque demand (e.g. APD). This enables the controller 104 to distinguish between a situation in which the driver applies APD at a slow rate where excess heat would be generated before launch, and a situation in which a sufficiently fast APD application takes place that the vehicle is expected to be launched before the limit becomes necessary or beneficial.

Implementation of the limit may require that the stall launch function is active so that the limit does not apply to other driving scenarios. In other examples, implementation of the limit may require that one or more of the stall launch function entry conditions is satisfied.

The limit may mean that the torque demand cannot be satisfied. Or, if the vehicle 100 is a parallel hybrid vehicle, the limit could be such that the proportion of torque generated by the ICE (de-clutched, or connected to a torque converter) relative to the traction motor 116a, 116b is increased so that APD is satisfied but with less contribution from the traction motor 116a, 116b.

In FIG. 3, the torque generated by the traction motor 116a, 116b rises proportionally to APD from time t1, until time t2 when the generated torque reaches a pre-launch threshold. The limit may prevent an amount of torque generation by the traction motor from exceeding the pre-launch threshold. In some, but not necessarily all examples, the proportionality is calibratable. In an implementation of this example, if the limit is applied the proportionality may be changed from normal such that less torque is generated by the traction motor 116a, 116b for a given APD. Likewise, in some examples, the rate of increase of torque generated by the traction motor 116a, 116b up to the pre-launch threshold may be limited to a lower, positive rate, than normal if the rate is applied, so there is more of a lag in torque generated in response to APD. Each of the above are example implementations of at least temporarily reducing the stall torque to reduce heat build-up. Although the above examples refer to a pre-launch threshold, it would be appreciated that in some implementations there is no pre-launch threshold.

The pre-launch threshold from time t2 to time t3 is a limit on generated torque by the traction motor 116a, 116b. The generated torque may be controlled to prevent it from exceeding the pre-launch threshold. In some examples, the pre-launch threshold may be set as a target that replaces the APB-based torque demand when the pre-launch threshold is exceeded, so that the generated torque drops back down to the pre-launch threshold after an overshoot.

The pre-launch threshold is configured to be low enough such that thermal de-rating of the traction motor 116a, 116b does not activate while the generated torque is at the pre-launch threshold for at least a predetermined length of time. The predetermined length of time may be in the order of seconds, e.g. for at least 5 seconds to allow the driver to actuate a stall launch sequence. However, the predetermined time could be longer in the order of minutes, hours or indefinite. The specific value of the pre-launch threshold depends on implementation and vehicle hardware capabilities (electric machines, power electronics, heat dissipation . . . ). In an example, the value is within the range of about 10% to about 70% of the maximum powertrain torque capacity. More precisely, maximum torque capacity can be that which is normally achievable at 100% APD. In a particular example, the value is about a third of the maximum. With larger traction motors and better heat dissipation, the value may be higher, up to about two thirds of the maximum.

Since the entry condition(s) for implementing the limit are satisfied before the torque generated by the traction motor 116a, 116b exceeds the pre-launch threshold, the vehicle 100 is pre-emptively controlled to avoid overheating. It can be said that the controller 104 is configured such that the torque generation is limited before the entry condition for the thermal de-rate function is satisfied. This makes it less likely for the thermal de-rate function to be entered during the stall launch.

The pre-launch threshold at t2-t3, and the first threshold for the braking at t0, should be calibrated such that the vehicle 100 remains stationary. In other words, the maximum positive wheel torque allowed by the pre-launch threshold should not be greater than the minimum negative (braking) wheel torque allowed by the first threshold for the braking. It would not be desirable for the vehicle 100 to creep forward unexpectedly while preparing a stall launch.

In some examples, the pre-launch threshold should not be too low either. The pre-launch threshold is configured to be high enough such that the powertrain and/or drivetrain is pre-loaded while the generated torque is at the pre-launch threshold. The pre-load may remove any lost motion and create some twist of the drivetrain. Consequently, a thump will not be perceived on vehicle launch. The pre-launch threshold may even be high enough to enable perceptible vehicle squat that feels proportional to torque demand, until the pre-launch threshold is reached. A lowest value of the pre-launch threshold depends on implementation but is expected to be no higher than about 5% in practice for larger traction motors and no higher than about 20% in practice for smaller traction motors.

The pre-launch threshold may be factory predetermined or may be variable in dependence on one or more parameters. The lower the threshold, the longer the duration of the lag time for meeting torque demand when the limit is removed. This lag may be unacceptable in some situations, including but not limited to:

The vehicle 100 is to launch against a gradient. For example, the pre-launch threshold may vary proportionally to the gradient. The gradient may be determined for example by a dynamic model of the vehicle 100 that determines the forces acting on the vehicle 100. The parameter for the model may be from a multiple-axis accelerometer (see FIG. 1B, 107), or an inclinometer or equivalent.

The vehicle 100 is in an off-road driving mode such as rock crawl or mud/ruts/sand, and may need quick bursts of low-mid torque from a standstill, to move a short distance. The parameter may be from a driving mode selector HMI control or equivalent.

The vehicle 100 is in a sport or racing driving mode such as dynamic, in which greater responsiveness is desirable. The parameter may be from a driving mode selector HMI control or equivalent.

The vehicle 100 is towing, which reduces acceleration. The parameter may be from a tow mode selector HMI control, or from a sensor configured to detect towing/hitching.

Any other relevant user setting is changed, such as by a dedicated HMI control for changing the pre-launch threshold.

In the above situations, the pre-launch threshold should be higher. Notably, the situations/parameters are independent of a temperature of the traction motor 116a, 116b/inverter 114. However in some examples, the threshold is further controllable based on detected parameters by sensors, such as traction motor/inverter temperature, or optimum torque for a detected vehicle and/or road condition for maximum acceleration.

In further examples, the pre-launch threshold may be controllable to lower over time, since when it is first applied. The threshold may lower once or a plurality of times or continuously in proportion to the time elapsed. This provides the benefit of energy saving and additional thermal protection.

The controller 104 may be further configured to pre-emptively set cooling demand for cooling the traction motor(s) and/or inverter(s) to full or higher-than-normal. This may be performed if the entry requirement(s) for the stall launch function are met, or when the limit is applied, or more specifically when the pre-launch threshold is reached, or at any other appropriate time.

At time t3 in FIG. 3, the hydraulic brake pressure falls, for example due to release of the brake pedal 108. The pressure may not necessarily fall instantaneously—FIG. 3 shows a decay. Since the stall launch function is active, the release of braking is taken as a signal to launch the vehicle 100. The limit is therefore removed in response to release of the at least one brake 111, so that the traction motor 116a, 116b can meet torque demand. For example, the pre-launch threshold is no longer the limit/target. The removal of the limit could be instantaneous or gradual.

There are various ways of determining release of the at least one brake 111. For example, the absence of BPD could provide an indication that a brake 111 is released. Alternatively, the hydraulic brake pressure could be monitored and when it falls, e.g. to zero, this provides an indication that the brake 111 is released. A second threshold may be implemented such that the determination is made only when the braking (e.g. BPD or hydraulic brake pressure) decreases past the second threshold. The second threshold could be the same as or different from the first threshold.

FIG. 3 provides an example. At time t3 hydraulic brake pressure decreases past the second threshold, satisfying the requirement of the brake(s) 111 being released. The limit is removed at time t3. The generated torque by the traction motor 116a, 116b climbs (not instantaneously in this example) to meet the torque demand. The speed of the vehicle 100 rises. The vehicle speed may rise slightly after t3 as hydraulic brake pressure takes time to decay. The second threshold may need to be high (>50% of BPD or the pressure) to compensate for the decay time of hydraulic brake pressure and ensure a faster launch. A faster decay may allow for a lower second threshold.

The stall launch function may include one or more other features in addition to the limit control described above.

For example, the stall launch function may perform one or more operations for increasing acceleration compared to if the stall launch function is inactive. For example, torque generated and/or braking and/or a rate of clutch release (if fitted) could be controlled to reduce the risk of wheelspin. As another example, the transfer case 120 could be set to a high or low range depending on the driving mode as described above. The low range could be selected in response to a manual user input or a user setting such as rock crawl mode, or used automatically in dependence on parameters determined from the sensing means 107, such as a high road gradient parameter. The transmission 118 could be controlled in a similar way. As another example, a torque split between axles of the vehicle 100 could be controlled to control weight transfer to maximize grip of the driven and/or steered wheels.

If the vehicle 100 has the architecture shown in FIG. 1B in which each axle 122, 124 has its own traction motor 116a, 116b, or each wheel has one, a torque split between axles of the vehicle 100 could take the form of front-biasing the torque before stall launch so that the front axle 122 receives more torque, then shifting torque rearward for a rear-biased or four-wheel drive launch so that the rear axle 124 receives more torque. The front-biasing is controlled to create more perceptible vehicle squat despite the limited pre-launch torque. The rearward torque shifting is to provide more traction during launch due to the load transfer to the rear. To implement this strategy, the pre-launch threshold for EM1 for the front axle 122 could be lower than the pre-launch threshold for EM2 for the rear axle 124. This strategy may be optimum for spreading the temperature increase between EM1 and EM2. Another reason for having different pre-launch thresholds and/or torque shifting between axles is that the traction motors at each axle may have different torque capabilities and/or different cooling capabilities. For example, the traction motor(s) for the rear axle may be larger than traction motor(s) for the front axle, so more relaxed limits may apply to the traction motor(s) for the rear axle, such as a higher pre-launch threshold.

For purposes of this disclosure, it is to be understood that the controller(s) 104 described herein can each comprise a control unit or computational device having one or more electronic processors 202. A vehicle 100 and/or a system thereof may comprise a single control unit or electronic controller or alternatively different functions of the controller(s) may be embodied in, or hosted in, different control units or controllers. A set of instructions 204 could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium 212 (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

Although embodiments of the present invention have been described in the preceding paragraphs with reference to various examples, it should be appreciated that modifications to the examples given can be made without departing from the scope of the invention as claimed. For example, the vehicle may be a fully autonomous vehicle. Acceleration and braking demands are from an autonomous driving controller rather than APD and BPD.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A controller for controlling torque generated by traction motors of a vehicle before a vehicle launch, wherein the traction motors comprise a first electric traction motor associated with a front axle of the vehicle and a second electric traction motor associated with a rear axle of the vehicle, the controller comprising:

means to determine that torque demand increases while simultaneously at least one brake of the vehicle is in an applied state;

means to, based at least in part on the determination, apply a first limit to torque generation by the first traction motor and a second limit to torque generation by the second traction motor in response to torque demand, wherein each limit inhibits an amount of torque generation by the corresponding traction motor from exceeding a respective pre-launch threshold;

means to remove the first limit and the second limit based at least in part on release of the at least one brake, wherein the torque generation is limited before an entry condition for a thermal de-rate function that de-rates the traction motors above a threshold temperature is satisfied;

means to determine that the at least one brake is in the applied state if braking from the driver is above a first threshold;

means to determine the release of the at least one brake if braking from the driver falls below a second threshold, the second threshold being higher than the first threshold; and means to, when the first and second limits are removed, cause the second electric traction motor to generate more torque than the first electric traction motor for meeting torque demand, wherein the second limit is lower for the second electric traction motor than the first limit for the first electric traction motor.

2. The controller as claimed in claim 1, wherein the first and second limits and the first threshold are configured such that the vehicle remains stationary while the first and second limits and the first threshold are applied even while torque generated by the first electric traction motor is at the first limit and torque generated by the second electric traction motor is at the second limit.

3. The controller as claimed in claim 1, further comprising means to cause a change of torque multiplication between the traction motors and at least one wheel of the vehicle and/or a change of torque split between the first and second axles of the vehicle before release of the at least one brake, wherein a direction of the change is dependent on either or both of a user setting and a parameter detected by a sensor.

4. The controller as claimed in claim 1, wherein each pre-launch threshold is configured to be low enough such that thermal de-rating of the traction motors does not activate while the generated torque is at the pre-launch threshold for at least a predetermined length of time.

5. The controller as claimed in claim 1, wherein each pre-launch threshold is configured to be high enough such that the powertrain and/or drivetrain is pre-loaded while the generated torque is at the pre-launch threshold.

6. The controller as claimed in claim 1, wherein each pre-launch threshold depends on at least a driving mode that is currently active.

7. The controller as claimed in claim 1, wherein each pre-launch threshold is configured to vary proportionally to a gradient against which the vehicle is to launch.

8. The controller as claimed in claim 7, wherein the gradient is determined based at least in part on a dynamic model of the vehicle that determines multiple forces acting on the vehicle.

9. The controller as claimed in claim 8, wherein a parameter for the dynamic model is from a multiple-axis accelerometer or an inclinometer.

10. The controller as claimed in claim 8, wherein a parameter for the dynamic model is from a driving mode selector human-machine interface (HMI) control.

\* \* \* \* \*